United States Patent

[11] 3,568,629

[72] Inventor Herbert B. Porter
  Montgomery County, Md. (6618 Westmoreland Ave., Takoma Park, Md., 20012)
[21] Appl. No. 747,299
[22] Filed July 24, 1968
[45] Patented Mar. 9, 1971

[54] ECCENTRIC GEARING MEANS
  6 Claims, 4 Drawing Figs.
[52] U.S. Cl. .................................................. 116/124, 74/804, 116/115.5
[51] Int. Cl. ................................................... B23q 17/00
[50] Field of Search ....................................... 116/124, 115.5, 115, 133 (Cursory); 90/59 (Inquiry); 235/(Inquiry); 74/804, 805

[56] References Cited
UNITED STATES PATENTS
| | | | |
|---|---|---|---|
| 1,235,437 | 7/1917 | Charel | 116/115.5 |
| 2,273,956 | 2/1942 | Hall | 116/124 |
| 2,709,924 | 6/1955 | Castelli | 116/115.5UX |
| 2,753,834 | 7/1956 | Bourguignon | 116/115 |
| 3,028,513 | 4/1962 | Sundt | 74/804X |
| 3,069,914 | 12/1962 | Laubenfels | 74/805UX |
| 3,320,828 | 5/1967 | Grant | 74/804X |
| 2,658,395 | 11/1953 | Coates | 116/124UX |

Primary Examiner—Louis R. Prince
Assistant Examiner—Daniel M. Yasich
Attorney—Addams and Ferguson ABSTRACT: A coarse dial for use with a milling machine or the like is disclosed, said dial indicating the distance the table is moved on the machine. In the preferred embodiment, a special gearing arrangement is provided for disposing the coarse dial immediately adjacent a vernier dial which typically is already incorporated in the machine. The special gearing arrangement includes an eccentrically mounted internal gear, at least one tooth of which engages at least one slot of a plurality of slots disposed on an inner peripheral surface provided on the coarse dial. A universal joint is provided to prevent the internal gear from rotating while at the same time permitting it to follow an eccentric motion.

INVENTOR
HERBERT B. PORTER

BY Adams & Ferguson
ATTORNEYS

PATENTED MAR 9 1971

INVENTOR
HERBERT B. PORTER

BY Addams & Ferguson
ATTORNEYS

ECCENTRIC GEARING MEANS

BACKGROUND OF THE INVENTION

This invention relates to a dial and in particular to a dial for indicating the linear distance the table is moved on a milling machine. This invention also relates to an improved gearing system whereby coarse and fine indications of the above distance are provided. Further, this invention relates to an improved gearing system for transmitting motion from a first shaft to a second shaft.

Heretofore, it has quite often been particularly awkward, if not difficult, to determine the linear distance the table is moved on a milling machine. For example, suppose a first hole has been made in a workpiece and it is desired to make a second hole 7.350 inches from the first. Various approaches have been employed on milling machines to insure that the table is moved this exact distance. For example, scales have been placed on the machines or a scale can be placed on the workpiece and then the distance marked off on the workpiece. However, this tends to be inaccurate and further the scales are usually difficult to see and awkward to use.

Further, rotary dials have been employed to indicate the distance the table is moved. However, these dials are so graduated as to provide only a vernier indication. In other words, one revolution of these dials typically corresponds to 0.200 inch or 0.250 inch, the individual gradations corresponds to 1 mil. Thus, if the milling machine operator wanted to measure off a distance of 7.350 inches as hypothesized above, it would be necessary for the operator to count 35 revolutions of the dial before the table had moved 7 inches, assuming that one revolution corresponded to 0.200 inch. Then, of course, a further appropriate fractional rotation of the dial would correspond to the remaining 0.350 inch. It can be seen that with such a dial the necessity for counting up to 35 or even higher numbers is readily prone to error inasmuch as the operator can easily lose count.

SUMMARY OF THE INVENTION

Thus, it is a primary purpose of this invention to provide improved dials for use with milling machines or the like whereby both a coarse and vernier indication of the distance traveled by the table is provided thereby avoiding the problems of the prior art discussed above.

It is a further object of this invention to provide dials of the above type wherein the coarse and vernier indications are disposed adjacent one another.

It is a further object of this invention to provide dials of the above type utilizing an improved gearing system for facilitating the location of the coarse indication adjacent the vernier indication.

It is a further object of this invention to provide dials of the above type wherein the vernier indication is provided by a rotary dial already mounted on an existing milling machine and where the coarse indication is provided by modifying the existing rotary dial to accommodate a further rotary dial so that the vernier indication provided by the existing rotary dial is related to the coarse indication provided by the further rotary dial.

It is a further object of this invention to provide an improved gearing system wherein motion may be transmitted from a first shaft to a second shaft coaxial with the first or vice versa.

It is a further object of this invention to provide an improved gearing system of the above type wherein motion may be transmitted from a shaft to a cylindrical sleeve concentric therewith or vice versa.

It is a further object of this invention to provide an improved gearing system of the above type wherein speed reduction is effected.

BRIEF DESCRIPTION OF THE DRAWING

FIG. 4 is a perspective view of a modified embodiment of dials for use with a milling machine or the like.

DETAILED DESCRIPTION OF A PREFERRED EMBODIMENT OF THE INVENTION

Figures 1, 2:
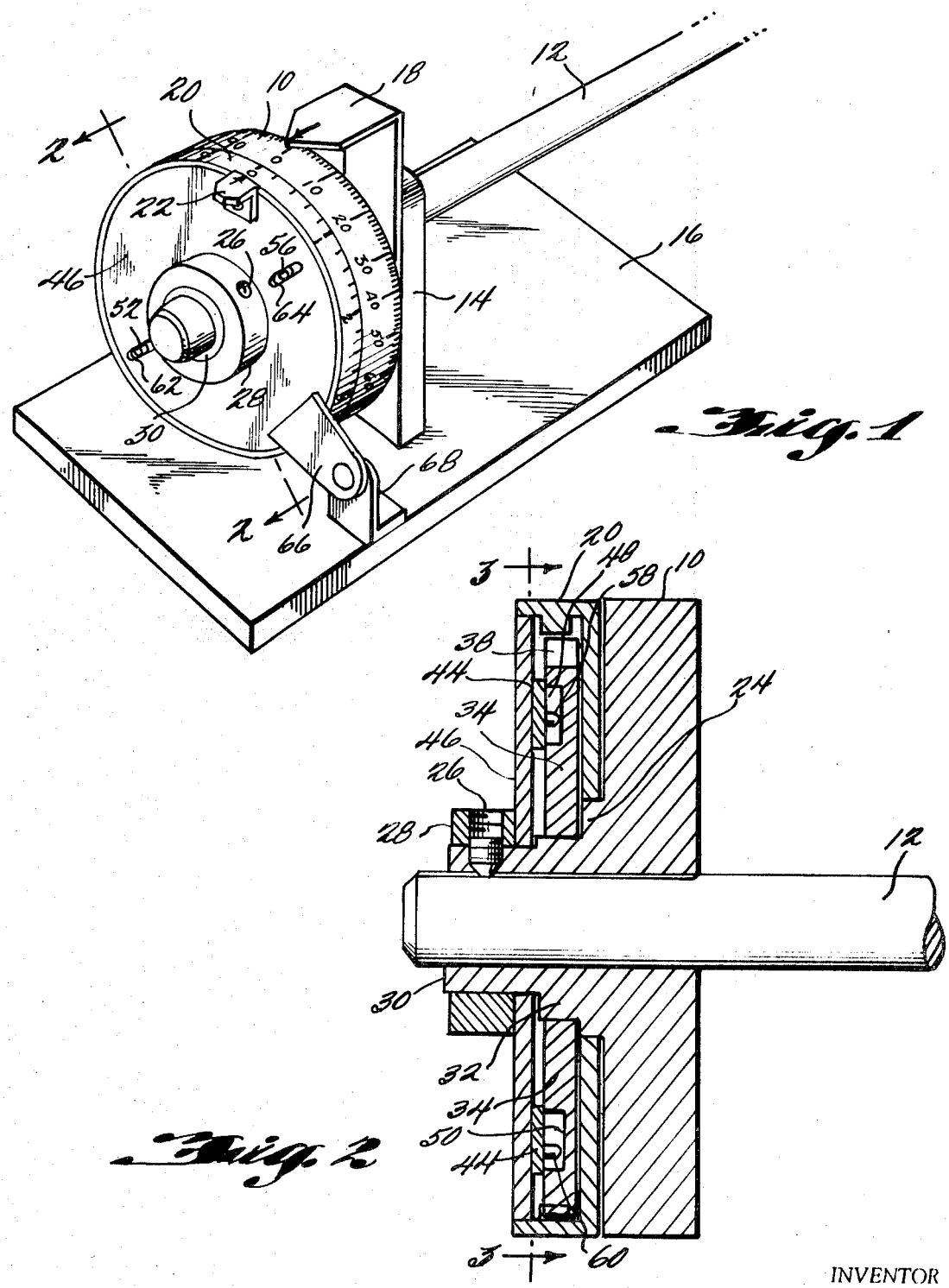
FIG. 1 is a perspective view of rotary dials which provide coarse and vernier indications for use with a milling machine or the like in accordance with the invention.
FIG. 2 is a cross section taken on the line 2—2 of FIG. 1.
Figure 3:
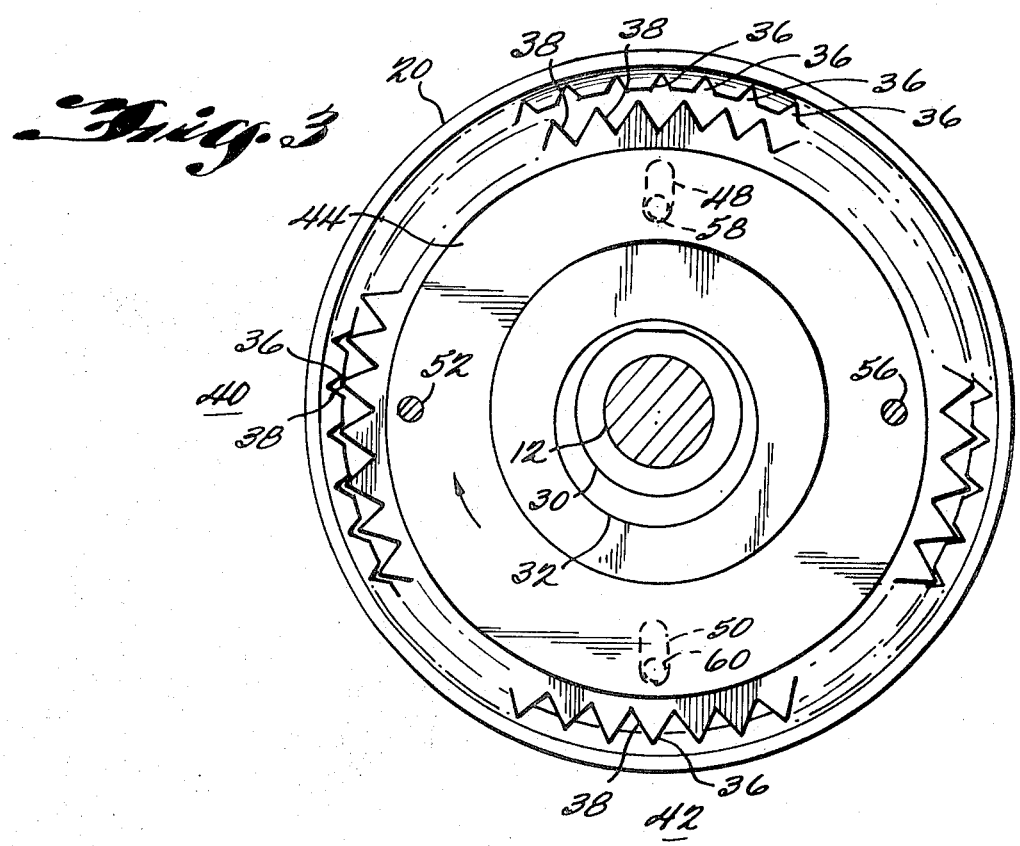
FIG. 3 is a cross section taken on the line 3—3 of FIG. 2.

Referring to FIGS. 1, 2 and 3 there is shown a preferred embodiment of rotary dials respectively providing coarse and vernier distance indications for use with a milling machine or the like. Like references numerals in the various FIGS. of the drawing correspond to like parts. The dial 10 provides the vernier indication of the distance the table is moved on a milling machine. This dial is mounted on shaft 12, one rotation of which typically corresponds to a linear movement of 0.200 or 0.250 inch of the table on a milling machine. That is, by means not shown but well known in this art, the shaft 12 is typically caused to rotate one time for each 0.200 or 0.250 inch that the table is moved through a linear distance. Hereinafter, it will be assumed that a single revolution of shaft 12 corresponds to a linear movement of 0.200 inch.

Attached to support 14 is a pointer 18 which enables the operator to set the dial 10 initially at zero thereby facilitating the measurement of desired distances.

Mounted adjacent vernier dial 10 is coarse dial 20 which in the preferred embodiment rotates one time for every 50 revolutions of vernier dial 10. Thus, if dial 10, as assumed above, rotates once for every 0.200 inch, coarse dial 20 rotates once every 10 inches. Of course, the number of revolutions of dial 20 with respect to dial 10 is dependent on the gearing therebetween and may be varied in accordance with the requirements of the particular application. Disposed adjacent but not connected to dial 20 is pointer 22 which enables the operator to establish the initial zero setting of the dial 20. Appropriate gradations are provided around dial 20 to indicate inch separations and between the inch markings, 0.200 inch separations are provided. Of course, other choices of gradations may be employed depending on the application.

Having described in general the relation between the vernier dial 10 and the coarse dial 20, the particular gearing for effecting this relation will now be described with respect to FIGS. 2 and 3. As can be seen in FIG. 2, the vernier dial 10 includes portions 24, 30, and 32 which may be integrally connected to each other as shown. The portion 30 is fixedly secured to shaft 12 by Allen screw 26 or other appropriate means. The screw 26 is secured through sleeve 28 which in turn is mounted over portion 30 of dial 10. Thus, the dial 10 will rotate with the shaft 12. However, it is to be understood that the portions 24, 30, and 32 may be separate elements as long as they are fixedly secured to the shaft 12. It should be further understood that the shaft 12 does not necessarily have to extend through the dial 10 and the portions 24, 30, and 32 as long as these elements rotate with the shaft.

The portion 24 supports the coarse dial 20 in concentric relation with respect to shaft 12. However, the coarse dial 20 is not fixedly secured to portion 24 and thus the portion 24 can and does slidably rotate within the dial 20. Portion 32 is circular and supports an internal gear 34 eccentrically with respect to the shaft 12, as can best be seen in FIG. 3. The gear 34 is slidably mounted on portion 32 and undergoes an eccentric motion with respect to shaft 12 as this shaft rotates. This eccentric motion and the means for establishing it will be described in more detail hereinafter.

As can best be seen in FIG. 3 the inner periphery of coarse dial 20 is provided with a plurality of slots 36 which mate with the teeth 38 of the gear 34. However, because of the eccentric mounting of the gear with respect to the shaft 12, only a limited number of teeth mate with or engage the slots at any given instant of time. Thus, as the shaft 12 rotates, the coarse dial 20 will undergo a much smaller number of rotations than the vernier dial 10 which is directly connected to the shaft 12. Further, the dial 20 will rotate in the same direction as the dial 10. Yet, further, these dials are disposed adjacent one another. Thus, it can be seen that for use in a milling machine or the like, the embodiment of FIGS. 1—3 is eminently suited for its purpose.

In order for the gear 34 to be effective in transmitting motion to the coarse dial 20, it is necessary that the gear undergo the eccentric motion mentioned hereinbefore; however, no rotation can be imparted to the gear 34. The eccentric motion of the gear 34 may be described as follows. Referring to FIG. 3 note that the maximum offset portion of the eccentric portion 32 faces downwardly toward the area generally indicated at 42. Thus, at least one of the teeth 38 engage the slots 36. The number of teeth that engage the slots at any given instant of time will be described in more detail hereinafter. However, it will be assumed hereinafter that only one of the teeth 38 actually engages a slot 36 at any given instant of time although in FIG. 3 it appears as though a plurality of teeth are simultaneously engaging a plurality of slots. This is not the case but it is difficult to show otherwise since the other teeth surrounding the tooth which is actually engaging a slot are just about to engage a slot or have just engaged a slot. Further, assume that the direction of rotation of eccentric portion 32 is as indicated by the arrow in FIG. 3. Thus, as the offset portion of eccentric portion 32 is moved through a quarter of a revolution it will slide within the gear 34 and point generally at the area indicated at 40 in FIG. 3 and at that time one of the teeth 38 will engage one of the slots 36 disposed in the area 40. Further, at this time the teeth disposed at the downward area 42 will have retracted from the slots disposed at this area. Hence, as eccentric portion 32 continues its rotational movement with shaft 12, the gear 34 will continue its eccentric motion as just described.

As mentioned above, the gear 34 cannot rotate as the eccentric portion 32 rotates. Rather, the portion 32 must slide within the gear 34. However, the tendency is for gear 34 to rotate with portion 32 since the fit between these members is rather snug although not tight. To prevent rotation of gear 34 while at the same time permitting eccentric motion thereof, a universal joint member is provided. As will be described in more detail hereinafter the universal joint comprises a connecting member 44 (see FIG. 3) which coacts with a cover member 46 (see FIG. 1) and gear 34, the coaction resulting in a universal joint effect whereby the gear 34 is permitted to move in any radial direction with respect to shaft 12 because of the motion of eccentric portion 32 but it is not permitted to rotate about the portion 32.

As can be seen in FIG. 3 the connecting member 44 is annular-shaped shaped and includes a first pair of pins 52 and 56 disposed at one side thereof and a second pair of pins 58 and 60 disposed at the opposite side thereof, the pins 52 and 56 being disposed on an imaginary line which is perpendicular to another imaginary line which connects pins 58 and 60. As can be seen in FIG. 2, the pins 58 and 60 are respectively disposed within a pair of slots 48 and 50 provided in gear 34. Further, as can be seen in FIG. 1, the pins 52 and 56 are respectively disposed within a pair of slots 62 and 64 provided in member 46. The member 46 has an arm 66 fixedly connected thereto, the arm 66 being fixedly connected to bracket 68 which in turn is connected to base 16. Thus, the member 46 does not rotate with respect to shaft 12 and any means for effecting this may be employed.

Members 44 and 46 prevent rotation of gear 34 and thus the first condition for satisfactory operation of the preferred embodiment is satisfied. Members 44 and 46 prevent rotation of the gear because of the connection of the gear to member 46 (which cannot rotate, as stated above) via pins 52, 56, 58, and 60.

Further, the desired eccentric motion of gear 34 is obtained by members 44 and 46 thereby satisfying the second condition for satisfactory operation. Members 44 and 46 permit the eccentric motion of the gear because the pins 52 and 56 slide within the slots 62 and 64 respectively while the pins 58 and 60 slide within the slots 48 and 50 respectively. Since these two sliding movements are substantially perpendicular to each other, the beforementioned universal joint effect is obtained thereby permitting the desired eccentric motion.

Another arrangement (not shown) which would satisfy the above conditions is that of a bellows so connected as not to rotate with shaft 12 and further connected to the periphery of gear 34 so as to permit the desired eccentric motion thereof. However, the bellows arrangement is not as advantageous as the gearing arrangement of FIGS. 1—3 because an undue amount of of space is taken up by the bellows. In contrast, the universal joint connection is compact and allows the coarse dial 20 to be disposed immediately adjacent the vernier dial 10.

The gearing arrangement comprising internal gear 34, the slotted inner periphery of dial 20 and the universal joint act as a speed reduction gear. Some of the design factors which determine the amount of speed reduction will now be discussed in relation to some specific examples. Assume that gear 34 has 49 teeth and that 50 slots are disposed on the inner periphery of dial 20. This means that for every 50 revolutions of vernier dial 10, coarse dial 20 will rotate one time. Thus, if one revolution of dial 10 corresponds to a measurement of 0.200 inch, one revolution of coarse dial 20 corresponds to 10 inches. Hence, a milling machine operator would not have to count the number of revolutions of the fine dial to keep track of where he is on the workpiece as is the case with certain prior art mills as discussed hereinbefore.

The circular pitch of the teeth of gear 34 must be the same as that of slots 36 or else jamming will occur. The difference in the number of teeth 38 and slots 36 is determinative of the amount of speed reduction effected. Thus, in the example cited above, the speed reduction is 50 to 1. However, if the number of teeth on gear 34 is reduced to 48 in number, a speed reduction of only 25 to 1 is effected, keeping in mind that the circular pitch must remain constant if the number of gear teeth is reduced.

In order to insure proper engagement of the teeth of gear 34 with the slots 36, it is necessary that the maximum offset of the circular eccentric portion 32 be such that the gear tooth 38 in a radial line therewith almost fully engage the slot 36 disposed adjacent thereto, a typical allowance of 0.005 inch being made between the apex of the tooth 38 and the nadir of the associated slot 36.

In the preferred embodiment of FIGS. 1 and 3, the driven member of the gearing system is the coarse dial 20. However, it should be understood that the dial 20 could be replaced by an internally slotted member which would connect to a cylinder concentric with the driving shaft 12 or it could be connected to another shaft coaxial with shaft 12 by an annular ring. Further, the shaft 12 could be the driven member with either of these arrangements. When the gearing arrangement is so employed to transmit motion to another shaft or the like, the driving force may be enhanced by increasing the number of teeth 38 which engage in the slots 36. This may be accomplished by substantially increasing the number of slots and teeth. Thus, if the number of teeth in the example cited hereinbefore were increased to 98 and the number of slots to 100, the number of teeth-engaging slots at any instant of time would be two rather than one. However, the speed reduction in this instance would remain at 50 to 1. Accordingly, as the number of teeth and slots are increased, the driving force is enhanced. It should be noted, however, that when the gearing arrangement employing 49 teeth and 50 slots is used to drive a coarse dial for use with a milling machine or the like, negligible power is absorbed in driving the coarse dial (and thus, little, if any, load is presented to the shaft 12) because only one tooth is engaging a slot at any given instant of time.

It should also be appreciated that although the universal joint for gear 34 is shown in FIGS. 1—3 is disposed at one side thereof, it would definitely be within the abilities of those having ordinary skill in this art to dispose the joint at the other side of the gear 34. Further, the slots 62 and 64 in member 46 (see FIG. 1) are shown as holes through member 46. However, to prevent dust and the like from entering the gear chamber, these slots would preferably be grooves formed in member 46 and facing gear 34. Further, the slots 48 and 50 formed in gear 34 may be holes extending through the gear for ease of manufacture rather than the grooves indicated in FIG. 02.

As shown in FIG. 2, member 46 acts as a cover for the gear chamber. Further, this member acts as a stabilizer for the coarse dial 20 as can be seen in FIG. 2. Thus, the dial is supported both at portion 24 and portion 30 of dial 10. With two supports, any tendency for the dial 20 to wobble as the shaft 12 rotates is minimized. As indicated in FIG. 1, the pointer 22 and the arm 66 are mounted on the outside face of cover member 46 so as to prevent any contact of these elements with the coarse dial 20 as it rotates.

Although not shown in the drawing it is, of course, contemplated that a movable dial could be mounted around coarse dial 20 to enable the machine operator to measure off successive distances along a workpiece or the like. For example, if a first distance of 3.587 inches were measured along the workpiece and then it was decided to move the drill, for example, 6.028 inches further along the workpiece, it would be preferable that the operator could place the zero of the movable dial where desired and thereby facilitate the desired measurement from the first point, the movable dial could conceivably be attached to coarse dial by means of steel tension springs mounted within the inner periphery of such a dial. Such expedients are well known to those of ordinary skill in this art and they form no part of this invention.

Further modifications of the eccentric portion 32 and gear 34 are possible in that two eccentric portions may be disposed along the shaft 12, each supporting its own internal gear where the teeth of both gears would engage the slotted inner periphery of dial 20 at diametrically opposite sides thereof. The maximum offsets of the eccentric portions would be disposed at diametrically opposite sides of the shaft. Thus, while the teeth of the first internal gear engage the slotted periphery of dial 20 at one side thereof, the teeth of the second engage the slots at the opposite side thereof. Hence, this further increases the stability of the coarse dial 20 since it is supported at two diametrically opposite points at all times.

A further modification of the internal gear may be made by replacing it with a deformable gear made from a suitable plastic or the like. The gear would be mounted eccentrically with shaft 12 as before. The universal joint would prevent gear rotation. Because the gear would deform as the shaft rotated, the number of teeth engaging the slots at any given instant of time would substantially increase and thus the driving force of the gearing arrangement would be enhanced especially when the gearing arrangement is used to transmit motion from one shaft to another as discussed hereinbefore.

Figure 4:
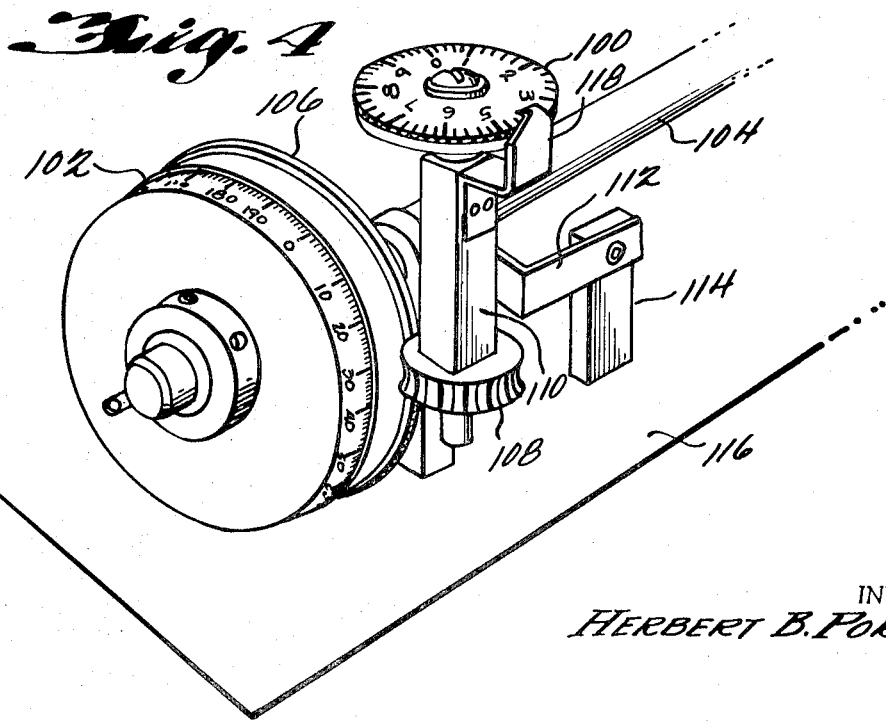

Reference should now be made to FIG. 4 which illustrates another embodiment of the invention wherein the coarse dial 100 is mounted away from the vernier dial 102, which, in turn, is mounted on driving shaft 104. Also concentric with and driven by shaft 104 is worm 106 which drives worm wheel 108, which in turn drives coarse dial 100. Typically, the gearing ratio of the worm gear is such that the dial 100 rotates one time for every 50 revolutions of shaft 104. Thus, the embodiment of FIG. 4 discloses another arrangement for providing a coarse indication of distance on a workpiece for use with a milling machine or the like. Dial 100 is mounted via post 110, bracket 112 and post 114 to base 116, which typically forms a part of the machinery. The dial also includes pointer 118.

Numerous modifications of the invention will become apparent to one of ordinary skill in the art upon reading the foregoing disclosure. During such a reading it will be evident that this invention provides a unique dial and gearing arrangement for accomplishing the objects and advantages herein stated. Still other objects and advantages and even further modifications will become apparent from this disclosure. It is to be understood, however, that the foregoing disclosure is to considered exemplary and not limitative, the scope of the invention being defined by the following claims.

I claim:

1. Apparatus for use will a milling machine or the like, said machine including a vernier dial to indicate the small distances a table is moved in said machine, said apparatus comprising:

speed reduction gearing means connected to said vernier dial;

a coarse dial connected to said speed reduction gearing means for indicating distances substantially larger than said small distances to thereby provide a coarse indication of the total distance said table is moved in said machine;

said vernier dial being fixedly and concentrically mounted with respect to the axis of a shaft;

said coarse dial being rotatably and concentrically mounted with respect to the axis of said shaft, said coarse dial including a hollow portion and on the inner periphery of said hollow portion a plurality of slots;

said speed reduction gearing means including an internal gear disposed within said hollow portion, said internal gear being eccentrically mounted on a support on said vernier dial; and means connected to said internal gear for preventing rotation of said gear with said shaft but permitting eccentric motion of said gear so that at least one of the teeth of said gear acts upon at least one of the said slots at all times whenever said shaft rotates;

said means for preventing rotation of said internal gear including universal joint means comprising:

a connecting member having a first pair of pins perpendicularly disposed to one side thereof along a first imaginary line and a second pair of pins perpendicularly disposed to the opposite side thereof along a second imaginary line substantially perpendicular to the first imaginary line;

a further member fixedly connected to a fixed reference point so that it cannot rotate with said shaft, said further member having a pair of elongated slots for receiving said second pair of pins; and where said internal gear includes a pair of elongated slots for receiving said first pair of pins.

2. Apparatus as in claim 1 where said fixed reference point is part of said machine.

3. Apparatus as in claim 1 where said further member is concentrically mounted with respect to the axis of said shaft and disposed within and adjacent to said hollow portion of the coarse dial so that said dial is supported at two inner peripheral lines to stabilize the motion of said dial as said shaft rotates.

4. Apparatus as in claim 1 where the circular pitch of said teeth and slots is equal.

5. Apparatus as in claim 1 where said coarse dial is mounted immediately adjacent said vernier dial.

6. Apparatus as in claim 1 where said eccentric gear has 49 teeth and the number of said slots is 50 to thereby effect a speed reduction from said vernier dial to said coarse dial of 50:1.